ns
3,415,867
PROCESS FOR THE PREPARATION OF DINITRO-
ACETONITRILE AND SALTS
Charles O. Parker, Huntsville, Ala., assignor to Rohm &
Haas Company, Philadelphia, Pa., a corporation of
Delaware
No Drawing. Filed Mar. 6, 1956, Ser. No. 569,943
11 Claims. (Cl. 260—465.1)

This invention deals with a method of preparing dinitrocyanomethides, $MC(NO)_2CN$, where M is hydrogen or an equivalent of a metal, a quaternary ammonium group, or an ammonium group from ammonia or an amine. According to this method an ester of dinitrocyanoacetic acid, $ROOCC(NO_2)_2CN$, is reacted with a compound having a reactive hydrogen or with an aqueous or alcoholic solution of a salt or hydroxide of a metal or a suspension of a reactive salt or a hydroxide of a metal, with ammonium hydroxide, with a quaternary ammonium hydroxide in water or alcohol, or with an amine. In this formula R represents an alkyl, cycloalkyl, or benzyl group, including nitroalkyl, nitroatalkyl, haloalkyl, nitrobenzyl, and cyanobenzyl groups, the alkyl groups having preferably not over four carbon atoms.

The method of this invention presents marked advantages over previously known processes for preparing dinitrocyanomethides. It avoids, for example, preparation of the unstable trinitroacetonitrile which on reduction also gives the desired dinitrocyanomethides. It obviates the prior isolation of a soluble salt of dinitroacetonitrile as an intermediate where other salts are desired.

The free dinitroacetonitrile may be first formed, if desired, by reacting an ester of dinitrocyanoacetic acid and an alcohol such as methyl, ethyl, propyl, isopropyl, or butyl alcohol or glycols typified by ethylene glycol, or by reacting a said ester and water or a mixture of water and a water-miscible alcohol. The product then formed has the formula $HC(NO_2)_2CN$ hydrated with water, which exists mostly stably when the composition is

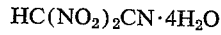

$$HC(NO_2)_2CN \cdot 4H_2O$$

M.P. 38°–40° C. This reacts readily with metal ions from salts or bases to give $MC(NO_2)_2CN$. If desired, an alcoholic solution of a metal salt or hydroxide or a suspension or solution of these in a mixture of alcohol and water may be mixed with a dinitrocyanoacetate ester and the salt of dinitroacetonitrile is formed in this reaction mixture.

The starting materials, esters of dinitrocyanoacetic acid, are prepared by the method described in my copending application Ser. No. 569,944 filed Mar. 6, 1956, now U.S. Patent 2,925,434. In accordance with this method oximinocyanoacetates, $NCC(NOH)COOR$, are reacted below about 30° C. with nitric acid, best in the form of mixed acid wherein nitric acid and sulfuric acid and/or polyphosphoric acid are present. An alkyl, cycloalkyl, or benzyl oximinocyanoacetate is added slowly with stirring, in the preferred method, to the mixed acid in the cold. The reaction may be completed by allowing the reaction mixture to warm up. The layers which form are separated. The organic layer is washed to free it of acid. The product, an ester of dinitrocyanoacetic acid, may be purified as by distillation, or for purposes of this invention it may be used in the somewhat crude form as obtained without purification. In this way there may be prepared methyl, ethyl, propyl, isopropyl, butyl, sec-butyl, isobutyl, and other alkyl esters, nitrobutyl, nitropropyl, nitratoethyl, chloroethyl, bromoethyl, cyclopentyl, cyclohexyl, methylcyclohexyl, chlorobenzyl, cyanobenzyl, nitrobenzyl, and like esters of dinitrocyanoacetic acid.

As compounds supplying hydrogen or metal ions there may be used any of the nucleophilic reagents or anionic reagents, particularly water, alcohols, or amines having hydrogen on the nitrogen thereof, an aqueous or alcoholic solution or suspension of a salt, advantageously a carbonate, of a metal, often desirably alkali and alkaline earth metals or their hydroxides, or a quaternary ammonium hydroxide.

Potassium compounds, such as potassium chloride, potassium bromide, potassium acetate, potassium sulfate, potassium carbonate, or potassium hydroxide, are particularly convenient to use as they give potassium dinitrocyanomethide, which separates from the usual solutions due to low solubility of potassium dinitrocyanomethide. Sodium dinitrocyanomethide is more soluble but may be formed without difficulty from sodium salts or sodium hydroxide. Barium, strontium, and calcium salts have interest and are readily prepared.

The metals which are useful are not, however, limited to the above. There may be used any metal in the form of a soluble salt or a reactive insoluble compound in a hydrolytic medium. There may thus be used aluminum in the form of its sulfates, chloride, nitrate, or its freshly formed hydroxide, cadmium or zinc in the form of salts including their carbonates, or hydroxides thereof, copper, again in the form of soluble salts or suspension of hydroxide, or manganese, mercury, silver, or thallium, in similar forms.

When a primary or secondary amine is used as a reactant, such as aniline, N-methylaniline, morpholine, pyrrolidine, piperazine, piperidine, butylamine, dibutylamine, allylamine, octylamine, ethanolamine, benzylamine, cyclohexylamine, dicyclohexylamine, ethylenediamine, or the like or such an amine as methylamine, dimethylamine, ethylamine, or diethylamine, which are conveniently used as solutions in water or alcohol, the ester of dinitrocyanoacetic acid may be reacted directly therewith to form an ammonium salt of dinitrocyanoacetic acid. The useful amines have at least one hydrogen on the nitrogen thereof.

When no water or hydroxylic solvent is present, as for example when the amine is dissolved in ether, benzene, or other non-aqueous solvent, a by-product is formed having the structure of a urethane in accordance with the typical equation:

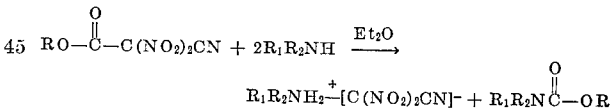

In the place of these amines there may be used ammonia in the form of solutions in water or alcohol or other solvent therefor. Also, quaternary ammonium hydroxides may be used, these being available in aqueous or alcoholic solutions. Typical quaternary ammonium hydroxides are the tetramethyl, trimethylbenzyl, dimethyldibenzyl, trimethylhydroxyethyl, trimethyl(nitratoethyl), propargyltrimethyl, dipropargyldimethyl, etc.

The exact nature of substituents on the nitrogen in amines or quaternary ammonium compounds is not critical, as all of these appear reactive and can form ammonium salts of dinitrocyanomethides.

Reactions of dinitrocyanoacetate esters and water, alcohols, amines, quaternary ammonium compounds, or other nucleophilic reactants or solutions of metal salts or hydroxides are carried out between about −10° and about 50° C., preferably 10° to 35° C. The reaction is generally exothermic and it may, therefore be desirable to cool the reaction mixture as reaction proceeds. Where the reaction is carried out in stages, the ester being first reacted with water or alcohol, for example, and then with a metal compound, these two stages can be effected in the same temperature ranges.

The products are obtained in some cases as precipitates or as residues which can be crystallized. Dinitroacetonitrile as such is usually obtained from an aqueous or alcoholic solution as a residue in the form of a low melting solid. Where volatile solvents are used, water-soluble salts can be precipitated by addition of a nonpolar organic liquid. Also, the products may be triturated or extracted to remove excess of reactants or starting materials.

Further details of procedure are shown in the illustrative examples which follow. Parts therein are by weight unless otherwise designated.

Example 1

There was dissolved 2.0 parts of ethyl dinitrocyanoacetate in ethyl ether (about 20 parts). This solution was stirred and cooled externally to about 15° C. while there was slowly added thereto 1.6 parts of aniline. Stirring was continued for 15 minutes with the temperature at 15° to 20° C. A crystalline product separated. The reaction mixture was filtered. The filter cake was thoroughly washed with ethyl ether and dried by exposure to air. It was identified as the aniline salt of dinitroacetonitrile. The yield was 89%. The melting point of this anilinium dinitrocyanomethide is 152° to 153° C.

The above procedure may be repeated with substitution of methyl dinitrocyanoacetate, or isopropyl dinitrocyanoacetate, or butyl dinitrocyanoacetate, or cyclohexyl dinitrocyanoacetate for the above ethyl ester. In each case there is formed anilinium dinitrocyanomethide.

In place of aniline there may be used other primary amines, such as methylamine, cyclohexylamine, or tert-butylamine, ethylenediamine, guanidine, or hydrazine, or a secondary amine, such as piperidine, diethylamine, methylaniline, or dicyclohexylamine. In each case an ammonium dinitrocyanomethide is formed. With ethylenediamine the bis salt is formed, ethylenediammonium bis(dinitrocyanomethide).

Example 2

There was prepared a solution of 20 parts of distilled ethyl dinitrocyanoacetate in 41 parts of 95% ethanol. This was added with stirring over a five minute period to a solution of 23.8 parts of potassium bromide in 50 parts of water. The temperature of the mixture was kept below 35° C. by external cooling with an ice bath. A whitish solid precipitated immediately on addition of the initial quantities of the ester solution. The mixture was stirred for an hour, chilled to 0° C., and filtered to yield 16 parts of pure potassium dinitrocyanomethide. The yield was almost 96%.

In place of the above ethyl ester, there may be used other esters with like result. In place of potassium bromide there may be used potassium chloride, potassium acetate, or other potassium salt to give in each case the desired potassium dinitrocyanomethide. Likewise, potassium hydroxide may be used.

Example 3

A solution of 10 parts of distilled ethyl dinitrocyanoacetate in 41 parts of 95% ethanol was slowly added with stirring to a solution of 5.6 parts of potassium hydroxide in 50 parts of 95% ethanol. An exothermic reaction occurred. The temperature of the reaction mixture was controlled and kept below 35° C. by cooling with the aid of an ice bath. During the reaction a solid precipitated. The reaction mixture was stirred for an hour at room temperature. It was then chilled to 0° C. and filtered to give 11 parts of solid material. The filtrate was treated with an equal volume of ethyl ether. A small amount of a solid precipitated, which was filtered off. It amounted to 0.7 part and was added to the first solid filtered off. The combined solids were dried and extracted with acetone to yield 8.1 parts of pure potassium dinitrocyanomethide—a yield of 97%.

The above procedure was repeated with 101 parts of an undistilled ethyl dinitrocyanoacetate obtained as the washed organic layer from the reaction of nitric acid in mixed acid and ethyl oximinocyanoacetate. The quantities of solvents and potassium hydroxide were ten times those used just above. There was obtained potassium dinitrocyanomethide in an amount of 77 parts—a yield of 91% on the assumption that the starting material was the essentially pure ethyl ester.

Example 4

To 25 parts by volume of ethanol, which was freshly distilled from magnesium ethoxide, there was slowly added with stirring 16.9 parts of ethyl dinitrocyanoacetate. There was a noticeable evolution of heat and the reaction mixture was held at about 30° C. with cooling. The reaction mixture was left standing overnight. The mixture was heated to 40° C. and ethanol was taken off under reduced pressure and collected. The distillate was treated with three times its volume of water. An organic layer formed and was separated. Meanwhile, the residue from the distillation was added to an aqueous sodium bicarbonate solution. This mixture was extracted with ethyl ether. The extract was added to the organic layer and this mixture was washed with sodium bicarbonate solution and dried over sodium sulfate. The ether was evaporated to leave a liquid residue of 7.7 parts. This was distilled at 122°–124° C. to give a fraction of 5.8 parts of diethyl carbonate.

To the sodium bicarbonate solution from treatment of the residue was added an excess of an aqueous potassium chloride solution. A precipitate formed. It was filtered off, washed, and dried to give 9.1 parts of potassium dinitrocyanomethide, melting at 266°–268° C.

By comparable procedures there are prepared cesium dinitrocyanomethide, melting at 218°–250° C. and rubidium dinitrocyanomethide melting at 240°–242° C.

Example 5

To a stirred suspension of 61.6 parts of barium carbonate in 250 parts of absolute ethanol there was slowly added with stirring 118 parts of distilled methyl dinitrocyanoacetate. The reaction mixture was kept at about 30° C. When evolution of gas ceased, increments of barium carbonate were added to the reaction mixture until some remained undissolved. The reaction mixture was then stirred for 30 minutes and filtered. While the clear filtrate was stirred, it was diluted with ethyl ether at about 0°–5° C. A nearly white salt crystallized out and was washed with ether. This salt was dried. It then amounted to 101 parts. The product was barium dinitrocyanomethide monohydrate. It was identified further by quantitative determination of the dinitrocyanomethide ion spectrophotometrically with ultraviolet light and gravimetrically with tetraphenylarsonium chloride.

In a generally similar manner these are reacted methyl or ethyl dinitrocyanoacetate and nickelous carbonate to give nickel dinitrocyanomethide, a bluish-green solid, formed as a pentahydrate when any water is present. With cadmium carbonate there is formed cadmium dinitrocyanomethide. A whitish solid, appearing as the pentahydrate when water is present. From strontium carbonate there is formed strontium dinitrocyanomethide, which is obtained as a yellow solid.

Example 6

A solution of 23 parts of butyl dinitrocyanoacetate was made in about 100 parts of ethyl ether. The mixture was stirred and cooled to about 10° C. Gaseous ammonia was bubbled through the solution. A white precipitate formed. It was filtered off, washed well with ether, and dried under vacuum. There was obtained 25 parts of product which corresponded in composition to $NH_4C(NO_2)_2CN$, ammonium dinitrocyanomethide, melting at 169° C.

Example 7

There were added 22 parts of isopropyl dinitrocyanoacetate to 100 parts of aqueous ethanol (1:1) with control of the temperature by external cooling, the reaction mixture being maintained between 25° and 30° C.

Separately there was added 23.8 parts of propargyl bromide to 15.6 parts of dimethylaminoacetonitrile in 45 parts of ethanol. The mixture was then held at 40° C. for 30 minutes. There was formed on cooling crystals of propargyldimethyl(cyanomethyl)ammonium bromide in an amount of 27.2 parts. This salt was dissolved in the minimum quantity of water.

The resulting solution was added to the aqueous alcoholic solution described first above. When the mixture was cooled to about 5° C., 31 parts of product separated. This was recrystallized from water. The product corresponded by analysis to propargyldimethyl (cyanomethyl)ammonium dinitrocyanomethide. It melted at 81°–84° C.

In the same way there was formed from isopropyl dinitrocyanoacetate or from methyl dinitrocyanoacetate and propargyltrimethyl ammonium bromide propargyltrimethylammonium dinitrocyanomethide melting at 175°–178° C.

When tetra(2-nitratoethyl)ammonium nitrate was used, there was obtained tetra 2-nitratoethylammonium dinitrocyanomethide, which melted at 137°–138° C.

Example 8

There was added one part of ethyl dinitrocyanoacetate to 5 parts of aqueous 50% ethanol, the temperature being maintained below 30° C. Thereto was added a solution of 3.5 parts of tri(ethylenediamine) cobaltic chloride in 15 parts of water. A yellow-orange solid precipitated immediately. It was separated, washed with water, and dried under vacuum. It corresponded by analyses, including Karl Fischer determination of water, to the monohydrate of tris(ethylenediamine)cobaltic dinitrocyanomethide.

In the same ways there were prepared the hexamminecolbaltic, pentamminenitratecobaltic, tetramminecupric, and related complex metal salts of dinitroacetonitrile.

Example 9

There was added five parts of ethyl dinitrocyanoacetate to 25 parts of ethanol, as in previous examples. Thereto was added a solution of five parts of guanidine carbonate in water. The mixture was stirred until gas evolution ceased. The guanidinium dinitrocyanomethide precipitated and was filtered off. It was recrystallized from hot ethanol. It then melted at 166°–167° C. On analysis it was found to contain 19.8% of carbon, 3.39% of hydrogen, and 44.39% of nitrogen (theory 18.94%, 3.18%, and 44.20% respectively).

In a similar way hydrazine hydrate is reacted with an alcoholic solution of an ester of dinitrocyanoacetic acid to give hydrazinium dinitrocyanomethide, melting at 123°–126° C.

The process of this invention in which an ester of dinitrocyanoacetic acid is reacted with a compounds such as water, an alcohol, or amine to give dinitroacetonitrile which may be separated as a salt thereof, avoids the toxic, dangerous trinitroacetonitrile intermediate of the previous process and the reduction thereof with an expensive and corrosive hydrobromic acid. This new process is relatively simple and direct and provides excellent yields of pure products. These products are exceptionally useful as components of propellant mixtures for controlling the burning rates therof.

For example, a double base propellant was prepared from nitroglycerin and nitrocellulose in 3:4 ratio. This had a burning rate in a strand burner of 0.7 inch per second at 1000 p.s.i. Addition of 8.75% of sodium dinitrocyanomethide changed the burning rate to 3.5 inches per second at 1000 p.s.i. The same percentage of potassium dinitrocyanomethide gave a burning rate of 1.2 inches per second at 1000 p.s.i. Cesium dinitrocyanomethide at 8.75% changed the burning rate to 0.9 inch per second, as did also the calcium salt. Barium dinitrocyanomethide at 8.75% gave a burning rate of 1.2 inches per second. Tetra(2-nitratoethyl)ammonium dinitrocyanomethide on the other hand lowered the burning rate to 0.6 inch per second.

Incorporation of dinitrocyanomethide salts, particularly those of sodium, potassium, and barium, into propellant matrices in proportions greater than those mentioned above, as for example, 15%, 20%, 25%, or 30%, all by weight, produces progressively faster burning rates, roughly in proportion to the amount added. The increased burning rates given in detail above for a double base propellant are realized in the case of other propellant compositions. Furthermore, this effect can be approximated in using one or more of these salts by itself or themselves in a binder, such as a resinous binder. Burning rates as high as 8 inches per second at 1000 p.s.i., in conjunction with other desirable ballistic properties have been obtained from compositions comprised of dinitrocyanomethide salts and binder above.

I claim:

1. A process for the preparation of dinitroacetonitrile and salts thereof which comprises reacting between −10° and about 50° C. an ester of the formula:

where R is a member of the class consisting of alkyl, nitratoalkyl, nitroalkyl, and haloalkyl groups of not over four carbon atoms, cycloalkyl, nitrobenzyl, and cyanobenzyl groups and a nucleophilic reagent from the class consisting of water, lower alkanols, primary and secondary amines, ammonium hydroxide, quarternary ammonium hydroxides, aqueous and alcoholic solutions of metal salts and hydroxides, and aqueous and alcoholic suspensions of reactive metal salts and metal hydroxides.

2. A process for the preparation of dinitroacetonitrile which comprises reacting between about −10° and 50° C. a lower alkanol and a lower alkyl ester of dinitrocyanoacetic acid.

3. A process for the preparation of salts of dinitroacetonitrile which comprises reacting between about −10° and 50° C. a lower alkanol and a lower alkyl ester of dinitrocyanoacetic acid and then reacting the resulting reaction mixture with an aqueous solution of an alkali metal salt.

4. A process according to claim 3 wherein the alkali metal is potassium.

5. A process for the preparation of salts of dinitroacetonitrile which comprises reacting between about −10° and 50° C. a lower alkanol and a lower alkyl ester of dinitrocyanoacetic acid and then treating the resulting reaction mixture with an alcoholic solution containing an alkali metal hydroxide.

6. A process according to claim 5 wherein the alkali metal is potassium.

7. A process for preparing salts of dinitroacetonitrile which comprises reacting between about 10° and 35° C. a lower alkyl dinitrocyanoacetate and a lower alkanol and then treating the resulting reaction mixture with an aqueous solution of an alkali metal hydroxide.

8. A process for preparing salts of dinitroacetonitrile which comprises reacting between −10° and 50° C. a lower alkanol and a lower alkyl ester of dinitrocyanoacetic acid and then treating the resulting reaction mixture with an aqueous suspension of an alkaline earth carbonate.

9. A process for preparing an ammonium salt of dinitroacetonitrile which comprises reacting between about 10° and 35° C. a lower alkyl dinitrocyanoacetate and a primary amine.

10. A process according to claim 9 wherein the amine is guanidine.

11. A process for preparing ammonium dinitrocyanomethide which comprises reacting between 0° and 50° C.

a lower alkyl ester of dinitrocyanoacetic acid and ammonium hydroxide.

References Cited

UNITED STATES PATENTS 2,925,434  2/1960  Parker _____ 260—465

JOSEPH P. BRUST, *Primary Examiner.*

U.S. Cl. X.R.

149—109, 97; 260—429, 429.9, 439, 438.1, 430, 465.4, 465, 464, 465.5, 247, 247.2, 268, 326.8, 471, 482, 468, 294.9, 295, 431